United States Patent Office 2,838,152
Patented June 10, 1958

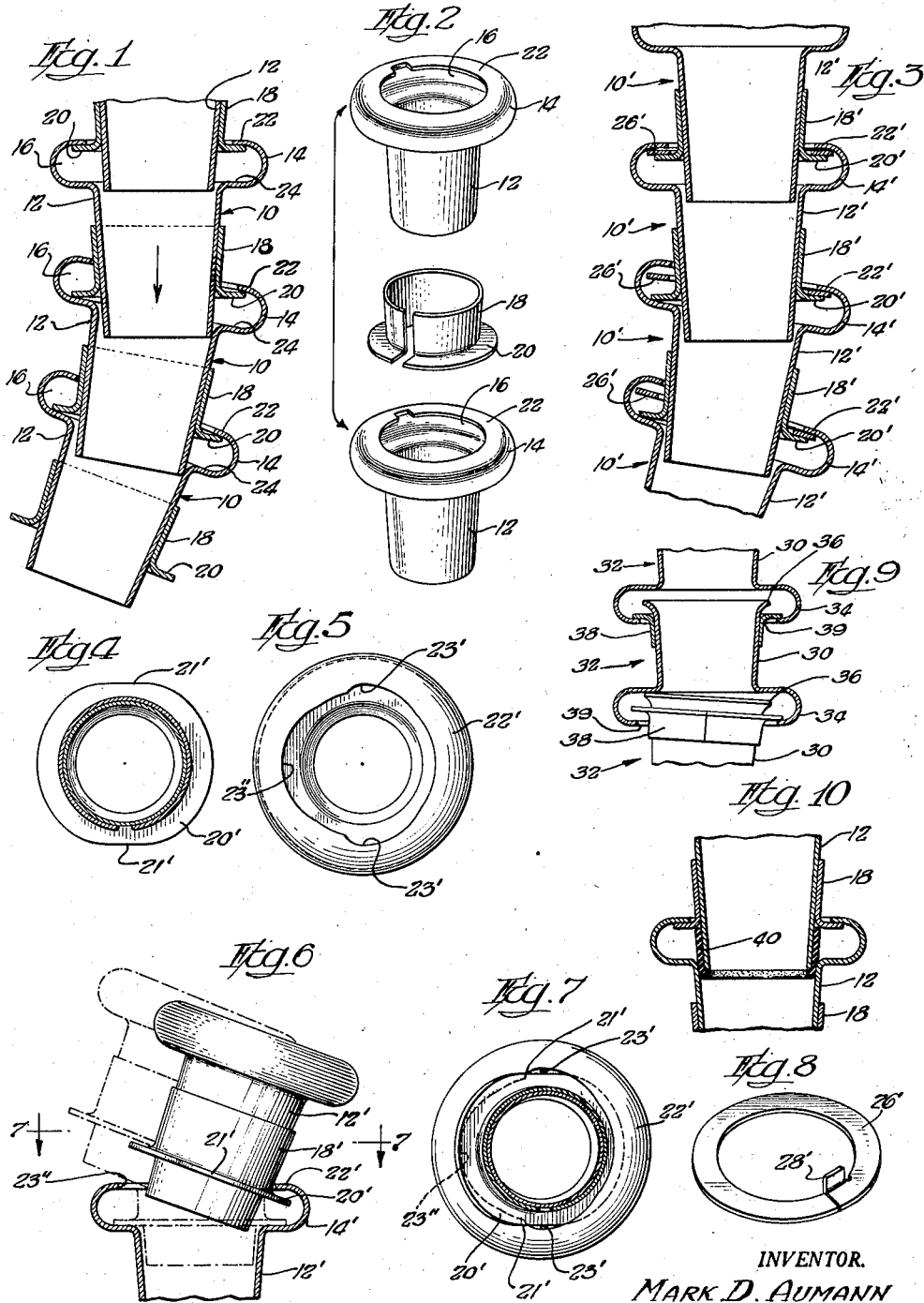

2,838,152

CIRCULAR FLEXIBLE CHUTE

Mark D. Aumann, Fullerton, Calif., assignor to Armament Components, Inc., Santa Ana, Calif., a corporation of California Application May 11, 1956, Serial No. 584,288

14 Claims. (Cl. 193—16)

This invention relates to flexible conveyor chutes such as are used for guiding articles of ammunition to or from an automatic gun, and particularly to a cylindrical chute of this character.

In flexible conveyor chuting of the present type, certain features are essential to efficient and dependable transfer of articles, such as rounds of ammunition or empty cartridge cases. One such feature is a smooth, unobstructed interior surface over which the article may slide during movement thereof through the chute. Secondly, the chute must be capable of a degree of flexing, preferably in any direction, without creating obstructions in the chute passage which would impede movement of the articles. Also, flexing must be limited to a minimum radius permitting free passage of articles through the chute. Finally in many cases it is desirable or essential that the chute be capable of having links added thereto or removed therefrom by rapid and easy manipulations performed entirely externally of the chute.

A primary object of this invention, accordingly, is the provision of a flexible cylindrical chute of the character described which possesses all of the above and other features.

Another object is the provision of a cylindrical chute having a relatively smooth interior guiding passage and which chute is capable of substantial flexing without creating obstructions in said passage so as to assure efficient and unimpeded passage of articles through the chute.

Yet another object is the provision of a flexible, cylindrical chute which is capable of substantial flexing in any direction throughout a complete 360° and wherein such flexing is accurately limited to the same minimum radius of curvature in all directions.

A further object is the provision of a flexible cylindrical chute wherein the several links may be rapidly and relatively simply joined to form a chute of desired length.

Yet a further object is the provision of a flexible cylindrical chute wherein the adjacent links are resiliently sealed so as to provide a substantially fluid-tight passage through the chute.

A still further object is the provision of a flexible cylindrical chute which is relatively sturdy and simple in construction and otherwise well suited to its intended use.

These and other objects are achieved by providing a chute comprised of a plurality of generally conical link sleeves each having an end loosely received within an end of a succeeding adjacent link sleeve and interconnected therewith, against axial separation therefrom, by a radial flange on the inner link sleeve loosely engaging in an annular recess defined by a ferrule on the end of the outer link sleeve. Arcuate flexing of the chute in any direction is accurately limited to the same predetermined minimum radius by proportioning of the links to achieve the proper clearance between the interfitting portions of adjacent links.

The several link sleeves may be either permanently joined or releasably joined so as to permit links to be added to or removed from the chute and, in a modified form of the invention, resilient sealing material between adjacent links provides a substantially fluid-tight, yet flexible, chute as is desirable in certain installations.

The invention may be best understood from the following detailed description taken in conjunction with the annexed drawings wherein:

Fig. 1 is a section taken longitudinally through a series of permanently interengaged links constituting one form of the present cylindrical chute;

Fig. 2 is an exploded view, in perspective, of the links embodied in the chute of Fig. 1;

Fig. 3 is a section taken longitudinally through a series of releasably engaged links constituting a modified form of the present chute;

Fig. 4 is an enlarged plan view of an annular flange on one of the links comprising the chute of Fig. 3;

Fig. 5 is an enlarged top plan view of one of the links comprising the chute of Fig. 3;

Fig. 6 is a view illustrating the manner of assembling the links shown in Fig. 3;

Fig. 7 is a section taken substantially along line 7—7 of Fig. 6;

Fig. 8 is a perspective view of a locking ring embodied in the chute of Fig. 3;

Fig. 9 is a section taken longitudinally through a further modified form of the present chute; and Fig. 10 is a partial section taken through a pair of adjacent, interengaged links in a still further modified form of the present chute.

The flexible chute illustrate in Figs. 1 and 2 comprises a series of links 10 each including a generally conical sleeve 12 the larger end of which is radially enlarged to form a ferrule 14 defining an internal, annular recess 16 of substantially semi-circular cross section. Fixed on sleeve 12, intermediate its ends, is a split conical collar 18 formed at the end thereof proximate to the smaller end of the conical sleeve 12 with an annular radial flange 20. Collar 18 is rigidly secured to sleeve 12 as by spot welding or bonding, with flange 20 of the collar spaced a distance from said smaller end of the sleeve 12.

In the assembled condition of the links 10 to form the present non-disassemblable flexible chute, shown in Fig. 1, the smaller end of the conical sleeve 12 of one link 10 extends loosely into the larger end of the conical sleeve 12 of an adjacent link 10, with the flange 20 of the collar on the former link extending loosely into the annular recess 16 of the latter link so as to retain the links against axial separation while permitting limited articulation thereof.

Assembly of the links 10 into a unitary chute may be accomplished by radial compression of the split collars 18, with resultant overlapping of the split edge portions thereof, sufficiently to allow insertion thereof through the circular opening defined by the inner edge of the ferrule end wall 22. The conical link sleeves 12 are then axially inserted into their respective split collars to expand the latter to normal condition after which the collars and conical sleeves are spot welded or otherwise bonded as previously mentioned.

It will be observed from Fig. 1 that with any given adjacent pair of links axially extended to bring the flange 20 on one link into flat abutment with the ferrule end wall 22 on the adjacent link, or are relatively tilted to engage one portion of the flange with the end wall 22 and a diametrically opposite portion of the flange with the other wall 24 of said ferrule, the smaller end of said one link completely overlaps the annular recess 16 in the adjacent link so that a relatively smooth, unobstructed guiding surface is maintained in the chute over which articles, moving in the direction indicated, may slide.

It will also be seen that the external and internal dimensions of the interfitting sleeve portions are such as to allow substantial articulation of the links. The maximum extent of articulation of adjacent links is limited equally in all directions throughout a complete 360° by abutment of diametrically opposed portions of the flange 20 on one link with the opposite walls 20 and 24 of the ferrule 14 on the adjacent link as well as by engagement of the collar 18 and smaller end of sleeve 12 on one link with the inner edge of the ferrule wall 22 and inner wall of the sleeve 12, respectively, of the adjacent link, as shown in Fig. 1. The axial spacing between the walls 22 and 24 of the annular recesses 16 in the several links is made such that arcuate flexing of the chute in any direction throughout a complete 360° is limited to predetermined minimum radius sufficiently large to permit free endwise movement of articles, such as rounds of ammunition or empty cartridge cases, through the chute.

Figs. 3–8 illustrate a modified form of the present flexible chute wherein the links 10'; which differ from the previously described links 10 only as hereinafter noted, are designed for releasable interconnection thereof so as to enable the addition of links to or removal of links from the chute. To this end, the flanges 20' on the collars 18', comprising each of the links 10', have diametrically opposed flats 21' (Fig. 4) and the ferrule walls 22' of the conical link sleeves 12' have their inner circular edges arcuately notched at 23' (Fig. 5) sufficiently to permit passage therethrough of the narrowed portions of the flanges 20' between the flats 21'. The circular edges of the ferrule walls 22' are also arcuately relieved at 23".

Prior to assembly of the links the collars 18' will be welded or otherwise firmly bonded on their respective conical sleeves 12'. To accomplish interconnection of a pair of adjacent links, the latter are angularly disposed as shown in Fig. 6, with the upper one of the links, as viewed in the figure, initially in its dotted line position. The upper link is now moved laterally to pass the aforesaid narrowed portion of its flange 20' through notches 23' in the end wall 22' of the other link until said flange underlies the ferrule end wall 22' opposite the recess 23" and the collar 18' abuts the edge of the wall, as shown in the solid line position of Figs. 6 and 7. The upper link is now pivoted to its phantom line position, the depth of the recess 23" being sufficient to accommodate this pivoting of the upper link to position its flange 20' entirely within the ferrule 14' of the lower link.

Indicated at 26' is a split locking ring which is inserted into the space between the flange 20' and the ferrule end wall 22', as shown in Fig. 3, to secure the links against separation. The locking ring is formed with a tab 28' which may be grasped to permit this insertion or subsequent removal of the locking ring into and from the ferrule recess by threading it through one of the notches 23'. After insertion of the ring, this tab will be positioned in one of the notches 23' so as to not interfere with flexing of the links.

A further modified form of the present chute is illustrated in Fig. 9 wherein the conical sleeves 30 comprising the links 32 of the chute are formed with a ferrule 34 at their smaller end, rather than at their larger end, as in Figs. 1–8. The larger ends of the sleeves 30 are slightly flaired, as shown at 36. A split flanged collar 38 is fixed on each of the sleeves 30 adjacent their larger end in the manner illustrated.

In the assembled condition of the links, the flaired end 36 and the flange on the collar 38 of each link is received in the ferrule 34 of an adjacent link, the flaired end of each link extending radially outwardly into the annular ferrule recess. Thus, it will be seen that in all relative angular positions of adjacent links, the peripheral edge of the larger end of one sleeve 30 is disposed outwardly of the inner guiding surface of the adjacent link at the smaller end of the latter so as to not obstruct the passage through the chute. Flexing of adjacent links in any direction is limited to the same extent by abutment of the collar flange and flaired end 36 of one link with opposite walls of the ferrule 34 of the adjacent link, as shown.

Assembly of adjacent links may be accomplished by radial compression of the collar 38 and insertion thereof into the ferruled end of an adjacent link in the same manner as described with reference to Figs. 1 and 2. The collar is then expanded sufficiently to permit insertion of the flaired end 36 of a sleeve 30 therethrough to the position shown after which the collar and sleeve are spot welded or otherwise bonded together. The opening 39 in the outer sleeve 30 will be made sufficiently large to accommodate such insertion of the flaired end of the sleeve through the collar when the latter is in position of the adjacent sleeve.

As shown in Fig. 10, resilient sealing sleeves 40 may be fixed on the smaller ends of the conical link sleeves 12 (or 12') to provide a substantially fluid-tight seal between adjacent links while allowing limited flexing of the latter.

It will be apparent from the foregoing description that there has been described and illustrated a flexible, cylindrical chute which is fully capable of attaining the several objects and advantages preliminarily set forth.

While certain preferred embodiments of the present invention have been disclosed, it should be understood that they are illustrative in nature only and that numerous modifications in design and arrangement of parts is possible within the scope of the following claims:

I claim:

1. A flexible chute, comprising: a series of interengaging links each including an open-ended sleeve having one end formed with an internal annular recess having opposing, axially spaced walls in transverse planes of the sleeve and laterally extending external flange means on the sleeve adjacent the other end thereof; the sleeves comprising the several links having smooth internal guiding surfaces and being arranged in end to end fashion with said other end of one sleeve loosely received in said one end of an adjacent sleeve and with said flange means on said one sleeve loosely engaging in the annular recess of said adjacent sleeve to retain the sleeves against axial separation while accommodating limited articulation thereof in any direction, said flange means being engageable with said opposing walls of said recess to limit said articulation in any direction.

2. A flexible chute, comprising: a series of interengaging links each including an axially tapered sleeve having one end radially enlarged and formed with an internal annular recess having opposing, axially spaced walls in parallel transverse planes of the sleeve and external, laterally extending flange means around the sleeve adjacent the other end thereof; the sleeves comprising the several links being arranged in end to end telescoped fashion with said other end of one sleeve extending loosely into said one end of an adjacent sleeve and with the flange means on said one sleeve loosely engaging in the annular recess in said adjacent sleeve to retain the sleeves against axial separation while accommodating limited articulation thereof in any direction; the axial spacing between the walls of each recess having a predetermined value such that maximum, relative articulation in any direction of adjacent sleeves is limited by engagement of diametrically opposite portions of the flange means on one sleeve with said walls of the recess in the adjacent sleeve.

3. A flexible chute, comprising: a series of interengaging links each including a generally conical sleeve formed with an internal annular recess at the larger end thereof, an annular, laterally extending flange about said sleeve adjacent the smaller end thereof, the sleeves comprising the several links being arranged in end to end telescoped fashion with the smaller end of one sleeve loosely extending into the larger end of an adjacent sleeve and with the annular flange on said one sleeve loosely engaging in the annular recess in said adjacent sleeve whereby the several sleeves are interconnected against axial separation and for equal limited articulation thereof in any direction, engagement of the flanges with the walls of their respective recesses serving to limit articulation of links in any direction.

4. A flexible chute, comprising: a series of interengaging links each including a generally conical sleeve formed with an internal annular recess at its larger end, a collar rigid on said sleeve and formed with an annular, laterally extending flange spaced from the smaller end of said sleeve, the several links being arranged in end to end fashion with the smaller end of the sleeve of each link loosely extending into the larger end of the sleeve of an adjacent link and with the annular flange on each link loosely engaging in the annular recess in the adjacent link for connection adjacent links for limited articulation and against axial separation, each recess having opposing, axially spaced walls in planes normal to the axis of the respective sleeve and the axial spacing between the walls of each recess having a predetermined value whereby arcuate flexing of the chute in any direction by articulation of the links will be equally limited to a minimum radius by abutment of the several flanges with the walls of their respective annular recesses.

5. The subject matter of claim 4 wherein each of said collars is longitudinally split to accommodate initial assembly of the links.

6. A flexible chute, comprising: a series of interengaging links each including a generally conical sleeve having an internal annular recess at its larger end and formed with an annular, laterally extending flange spaced from the smaller end thereof, the several links being arranged in end to end telescoped fashion with the smaller end of the sleeve of each link extending loosely into the larger end of the sleeve of an adjacent link and with the annular flange on each link loosely engaging in the annular recess in said adjacent link for connecting said links against axial separation and for limited articulation, each of said sleeves having an annular end wall in a transverse plane thereof forming a wall of the annular recess in the sleeve, said walls and flanges being configured to permit insertion of the flanges into their respective recesses, and a split retaining ring between each flange and end wall to retain the flanges in the recesses.

7. A flexible chute, comprising: a series of interengaging links each including a sleeve having an enlarged end, the sleeves comprising the several links being arranged in end to end telescoped fashion with the smaller end of the sleeve of each link extending loosely into the larger end of the sleeve of an adjacent link, means connecting the several sleeves against axial separation and for limited articulation, and a resilient sealing sleeve on the smaller end of each sleeve bearing against the inner surface of the adjacent link to provide a resilient, fluid-tight seal between adjacent sleeves.

8. The subject matter of claim 7 wherein said sleeves are conical sleeves.

9. A link for a flexible chute of the character described, comprising: a generally conical sleeve having an internal annular recess at one end, and an annular external flange about said sleeve spaced from the other end thereof.

10. A link for a flexible chute of the character described, comprising: a generally conical sleeve having an internal annular recess at one end, a conical collar rigid on the sleeve and formed with a laterally extending annular flange spaced from the other end of the sleeve.

11. The subject matter of claim 10 wherein said collar is longitudinally split.

12. The subject matter of claim 9 wherein the sleeve has an annular end wall at said one end thereof forming a wall of said annular recess, the inner edge of said wall being configured to accommodate insertion of a flange on an identical link into said recess.

13. The subject matter of claim 9 wherein said recess is at the larger end of the sleeve, and a resilient sealing sleeve on said conical sleeve between said flange and the smaller end of the conical sleeve.

14. A flexible chute, comprising: a series of interengaging links each including a conical sleeve outwardly flared at one end, the other end of the sleeve being radially enlarged and formed with an internal annular recess of given axial dimension, the sleeves comprising the several links being arranged in end to end, telescoped fashion with said one end of one sleeve loosely received in said other end of an adjacent sleeve with the flared end of the one sleeve extending into the annular recess of the adjacent sleeve, and an external, annular flange about each sleeve parallel to and spaced from the flared end of the latter sleeve a distance less than said axial dimension, said flange on each sleeve being engaged in the annular recess in its adjacent sleeve, abutment of the flared end and flange on each sleeve with the walls of the recess in the adjacent sleeve limiting relative articulation thereof.

References Cited in the file of this patent

UNITED STATES PATENTS

| 206,001 | Campbell | July 16, 1878 |
| 213,278 | Campbell | Mar. 18, 1879 |
| 428,023 | Schoff | May 13, 1890 |
| 830,957 | Baier et al. | Sept. 11, 1906 |
| 1,255,577 | Berry | Feb. 5, 1918 |

FOREIGN PATENTS

| 207,003 | Great Britain | Nov. 22, 1923 |
| 649,090 | Great Britain | Jan. 17, 1951 |
| 100,307 | Sweden | Nov. 19, 1940 |